(12) United States Patent
Beutin et al.

(10) Patent No.: US 8,037,687 B2
(45) Date of Patent: Oct. 18, 2011

(54) BYPASS TURBOMACHINE WITH REDUCTION OF JET NOISE

(75) Inventors: Bruno Albert Beutin, Evry (FR); Jacky Raphael Michel Derenes, Corbeil-Essonnes (FR); Frederic Paul Eichstadt, Livry/Seine (FR); Alexandre Alfred Gaston Vuillemin, Fontainbleau (FR)

(73) Assignee: SNECMA, Paris (FR)

( * ) Notice: Subject to any disclaimer, the term of this patent is extended or adjusted under 35 U.S.C. 154(b) by 956 days.

(21) Appl. No.: 12/188,472

(22) Filed: Aug. 8, 2008

(65) Prior Publication Data
US 2009/0064658 A1    Mar. 12, 2009

(30) Foreign Application Priority Data
Aug. 23, 2007 (FR) .................................... 07 57144

(51) Int. Cl.
*F02K 3/02* (2006.01)
(52) U.S. Cl. ... 60/725; 60/226.1; 60/226.2; 239/265.23; 239/265.19; 239/265.25
(58) Field of Classification Search .................. 239/127, 239/127.1, 265.17, 265.19, 265.25; 244/110 B; 60/264, 266, 204, 224, 226.2, 262, 39.093, 60/725
See application file for complete search history.

(56) References Cited

U.S. PATENT DOCUMENTS

| 5,603,531 A | 2/1997 | Maier |
| 6,679,048 B1* | 1/2004 | Lee et al. .......................... 60/204 |
| 7,159,383 B2* | 1/2007 | Barton et al. ................. 60/226.1 |
| 2005/0214107 A1* | 9/2005 | Gutmark et al. .................. 415/1 |

FOREIGN PATENT DOCUMENTS

| EP | 0 541 346 A1 | 5/1993 |
| EP | 1 553 282 A1 | 7/2005 |
| EP | 1 580 417 A2 | 9/2005 |
| FR | 2.039.393 | 1/1971 |

* cited by examiner

*Primary Examiner* — Ehud Gartenberg
*Assistant Examiner* — Steven Sutherland
(74) *Attorney, Agent, or Firm* — Oblon, Spivak, McClelland, Maier & Neustadt, L.L.P.

(57) ABSTRACT

In a bypass turbomachine, at least one air takeoff orifice is provided in the primary channel, said orifice leading to an air takeoff pipe housed inside an air inlet sleeve of the nacelle. The air takeoff pipe opens out in the vicinity of the pylon into two air diffusion pipes each secured to a respective maintenance cover, each air diffusion pipe opening out into an air injection pipe secured to a thrust reverser cover and itself opening out to the outside of the nacelle via the trailing edge thereof, each air injection pipe being suitable for uncoupling from the corresponding air diffusion pipe when the corresponding thrust reverser cover slides downstream.

5 Claims, 3 Drawing Sheets

BYPASS TURBOMACHINE WITH REDUCTION OF JET NOISE

BACKGROUND OF THE INVENTION

The present invention relates to reducing the jet noise from a bypass turbomachine nozzle. The invention relates more precisely to a bypass turbomachine with reduced jet noise.

Nowadays, sound pollution has become one of the major concerns of engine manufacturers, since they are becoming ever more confronted with the noise nuisance produced by their turbomachines. The sources of noise in a turbomachine are numerous, however it has been found that the jet noise at the outlet from the nozzle is the predominant noise, particularly while an airplane is taking off.

Certification authorities are becoming more and more demanding concerning noise emissions from turbomachines, and engine manufacturers are being required to reduce the noise produced by their turbomachines, and in particular the jet noise at the nozzle outlet.

Typically, a bypass turbomachine has a fan driven by a gas generator, a primary annular channel for passing a primary gas stream coming from the gas generator, said primary channel being defined on the outside by a primary fairing, and a secondary annular channel for the fan that passes a secondary stream of gas from the fan, the secondary channel being disposed coaxially about the primary channel and being defined on the outside by a nacelle.

In such a turbomachine, the jet noise comes essentially from the primary and secondary gas streams mixing in shear and from the secondary gas stream mixing in shear with an outer stream of air going round the nacelle. This noise is broadband noise at frequencies that are generated by two types of sound source: high frequency noise coming from small turbulent mixing structures between the generated streams close to the nozzle; and low frequency noise coming from large turbulent structures that appear far away from the jet.

Various solutions have been devised to reduce jet noise at the nozzle outlet. Those solutions are based on the principle of increasing mixing between the gas streams.

One of the known solutions consists in providing the turbomachine with a plurality of repeated patterns that are distributed all around the circumference of the trailing edge of the primary fairing and/or of the nacelle. By putting such patterns into place, mixing between the streams takes place by creating turbulence (or vortices) close to the nozzle so as to dissipate kinetic energy better, and consequently reduce the turbulent intensity of the large vortices that constitute the major sources of noise. By way of example, reference can be made to the following publications: U.S. Pat. No. 6,532,729 and US 2002/0164549-A1.

Another known solution consists in taking off air from within the turbomachine and injecting it through the trailing edge of the primary fairing and/or of the nacelle. Blowing air in this way also serves to encourage mixing between the streams by creating turbulence close to the nozzle so as to dissipate kinetic energy better. Reference can be made for example to the following publications: EP 1 580 417 and EP 1 580 418.

The present invention seeks to provide such a solution for reducing jet noise by blowing air, and to install it in a turbomachine having a thrust reverser system of the grid type.

In order to implement a grid type thrust reverser system, the nacelle has two thrust reverser covers in its downstream portion, which covers are in the form of semicylinders capable of sliding in a downstream direction parallel to the longitudinal axis of the turbomachine.

Unfortunately, the presence of these longitudinally-movable covers manifestly raises a problem of conveying air from the point where it is taken off in the turbomachine all the way to the trailing edge of the nacelle from which the air is to be blown. The air delivery circuit necessarily passes via the thrust reverser covers, so it must be able to accommodate their ability to move.

Furthermore, when the nacelle of such a turbomachine also includes two maintenance covers in its central portion that are suitable for pivoting about hinges that are parallel to the longitudinal axis of the turbomachine, the circuit for delivering the air that has been taken off is even more complicated to provide.

OBJECT AND SUMMARY OF THE INVENTION

The present invention seeks to remedy the above-mentioned drawbacks by proposing a simple and effective configuration for reducing jet noise by blowing air, and that is suitable for installing in a turbomachine having movable thrust reverser covers in its nacelle.

This object is achieved by a bypass turbomachine having a fan driven by a gas generator, an annular fan channel defined externally by a nacelle, and a primary annular channel for passing a flow of gas coming from the gas generator, the nacelle comprising from upstream to downstream:
  a stationary air inlet sleeve;
  two semi-cylindrical maintenance covers; and
  two semi-cylindrical thrust reverser covers that are movable relative to the air inlet sleeve by sliding in a direction parallel to the longitudinal axis of the turbomachine;
  the turbomachine further comprising at least one air takeoff orifice in the primary channel, the orifice leading to an air takeoff pipe housed inside the air inlet sleeve of the nacelle, the air takeoff pipe opening out, in the vicinity of a pylon for fastening the nacelle under an airplane wing, into two air diffusion pipes, each secured to a respective maintenance cover, each air diffusion pipe opening out into an air injection pipe that is secured to a respective thrust reverser cover and that itself opens out towards the outside of the nacelle via the trailing edge thereof, each air injection pipe being suitable for uncoupling from the corresponding air diffusion pipe on the corresponding thrust reverser cover sliding downstream.

With such a configuration, the air taken off from the primary channel follows the air takeoff pipe housed in the air inlet sleeve, then it flows along one of the two air diffusion pipes secured to respective maintenance covers, and finally it flows along the corresponding air injection pipe. Since each air injection pipe is suitable for coupling from the corresponding air diffusion pipe, the turbomachine of the invention can accommodate the fact that the thrust reverser covers slide downstream when the thrust reversal is deployed. As a result, it is possible in this type of turbomachine to take air from the fan channel and to deliver it all the way to the trailing edge of the nacelle.

In an advantageous disposition, the maintenance covers are movable relative to the air inlet sleeve by pivoting about hinges parallel to the longitudinal axis of the turbomachine and situated in the vicinity of the pylon, each air diffusion pipe being suitable for deforming during pivoting of the corresponding maintenance cover. This characteristic makes it possible to take account of the fact that the maintenance covers can be pivoted when performing maintenance operations on the gas generator.

Under such circumstances, each air diffusion pipe is made of a flexible material so as to make it easier to deform the air diffusion pipe.

Preferably, each air injection pipe includes an endpiece that is conical so as to make it easier to couple and uncouple the air takeoff pipe.

The turbomachine may also include a control valve mounted in the air takeoff pipe.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
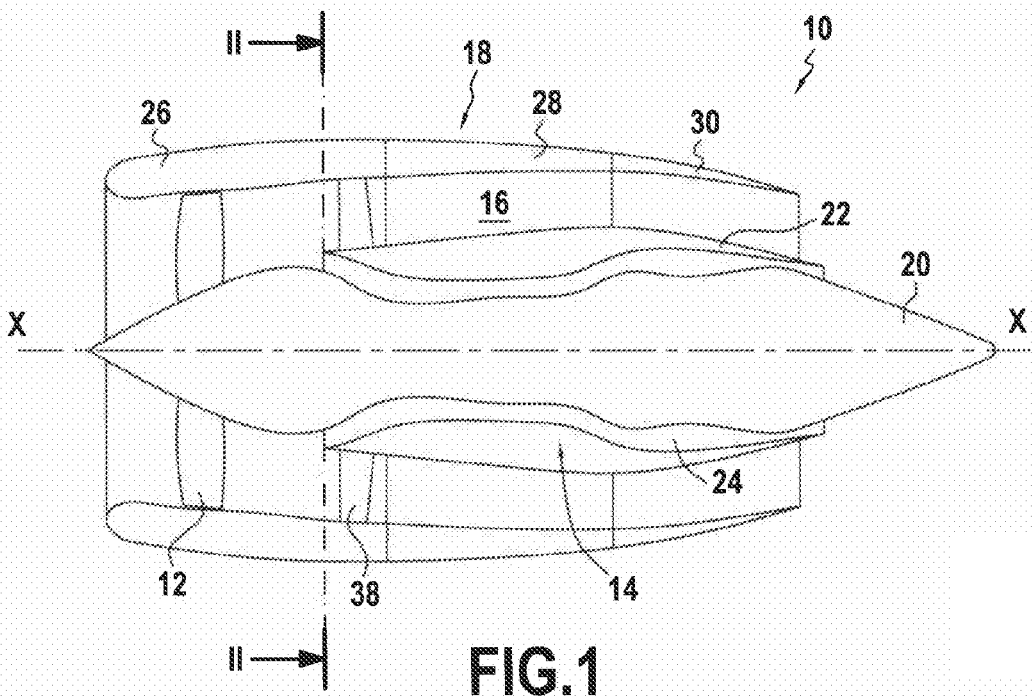
FIG. 1 is a longitudinal section view of a turbomachine of the invention.

The turbomachine 10 of longitudinal axis X-X shown in FIG. 1 is of the bypass type.

In well-known manner, it comprises in particular a fan 12 that is driven by a gas generator 14, and an annular fan channel 16 that is defined on the outside by a nacelle 18.

The turbomachine 10 also comprises a central annular body 20 centered on the longitudinal axis X-X, and a primary annular fairing 22 disposed coaxially around the central body 20 so as to co-operate therewith to define a primary annular channel 24 for passing a flow of gas from the gas generator 14.

Figure 2:
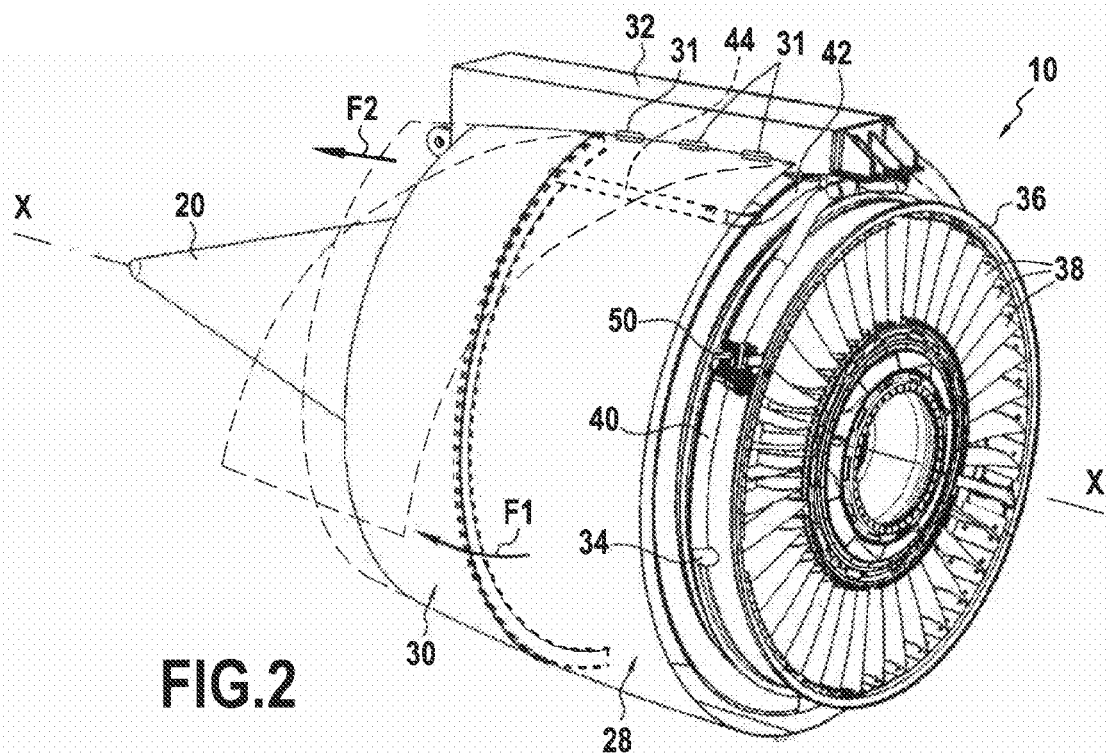
FIG. 2 is a perspective view, in section on II-II of FIG. 1.

Going from upstream to downstream in the flow direction of the stream inside the turbomachine, the nacelle 18 comprises an annular air inlet sleeve 26, two maintenance covers 28 of semi-cylindrical shape (only one of them is visible in FIG. 2), and two thrust reverser covers 30 likewise in the form of half-cylinders (only one of them is visible in FIG. 2).

The maintenance covers 28 are situated in the central portion of the nacelle. These covers can be moved relative to the air inlet sleeve 26 by pivoting about hinges 31 that are parallel to the longitudinal axis X-X and that are situated in the vicinity of a pylon 32 for fastening the nacelle under an airplane wing.

Thus, as shown in dashed lines in FIG. 2, each maintenance cover 28 can be raised by pivoting in the direction of arrow F1 about its hinge. In the cover-open position, access is thus made available to the gas generator in order to facilitate maintenance operations on the turbomachine. This pivoting of the maintenance covers can be driven by hydraulic actuators.

The thrust reverser covers 30 comprise part of the thrust reverser system of the turbomachine. Such a system is well known in itself and serves to increase airplane safety by providing a braking force during landing.

The thrust reverser system used in this example is of the known grid type: the covers 30 are disposed at the downstream end of the nacelle and can be moved relative to the air inlet sleeve 26 by sliding in a direction parallel to the longitudinal axis X-X of the turbomachine.

More precisely, as shown in dashed lines in FIG. 2, each thrust reverser cover 30 can slide downstream in the direction of arrow F2, this sliding being driven, for example, by a hydraulic actuator system (not shown in the figures).

The open position of the covers 30 corresponds to the thrust reversing position: when they are in this position, the covers 30 reveal openings (not shown in the figures) opening out into the fan channel 16 and inclined so as to direct the flow of air passing through these openings in an upstream direction so as to provide the airplane with reverse thrust. The details of a grid thrust reverser system are well known to the person skilled in the art and are therefore not repeated here.

In the invention, provision is made to take off air flowing in the primary channel 24 so as to inject it at the trailing edge of the nacelle 18, and more precisely at the trailing edges of the thrust reverser covers 30.

For this purpose, the turbomachine of the invention has an air takeoff orifice (or scoop) 34 in the primary channel 24. As shown in FIG. 2, this air takeoff orifice 34 may be formed through an intermediate casing 36 of the turbomachine and may pass through the fan channel 16 by going via the inside of a stationary flow-directing vane 38 of the fan.

The air takeoff orifice 34 also opens out in an air takeoff pipe 40 that is stationary and housed inside the air inlet sleeve 26 of the nacelle 18.

As shown in FIGS. 2 to 6, this air takeoff pipe 40 can be placed around the intermediate casing 36 of the turbomachine and go up to the "noon" position, i.e. up to the pylon 32 of the turbomachine, to which it is likewise fastened.

At its end opposite from the air takeoff orifice, each air takeoff pipe 40 opens out in the vicinity of the pylon 32 into a respective one of two air diffusion pipes 42, each of which is secured to a respective one of the maintenance covers 28.

The air diffusion pipes 42 are firstly connected to the air takeoff pipes 40 that are stationary, and they are secondly fastened to a respective maintenance cover that is movable. In order to be able to pivot with the covers, each air diffusion pipe 42 is thus suitable for deforming during pivoting of the corresponding maintenance cover 28.

Figure 3:
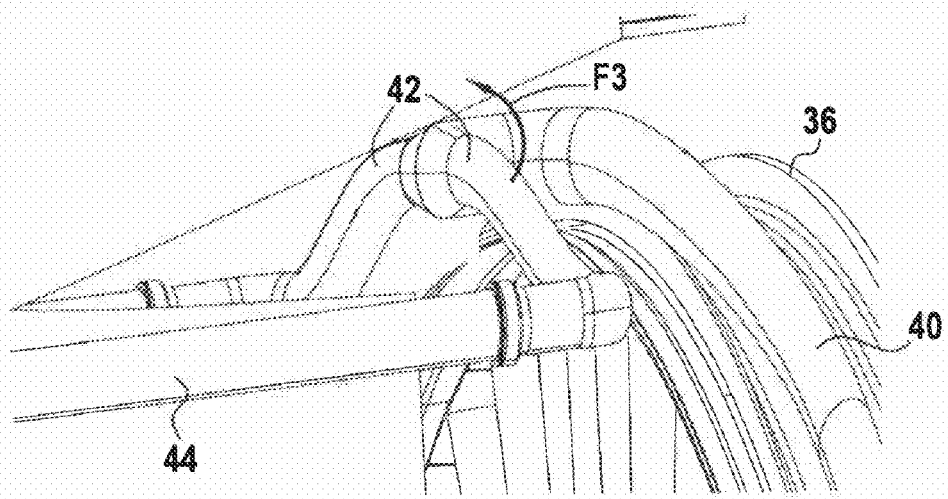
FIGS. 3 to 6 shows details of the FIG. 2 turbomachine.
Figure 4:
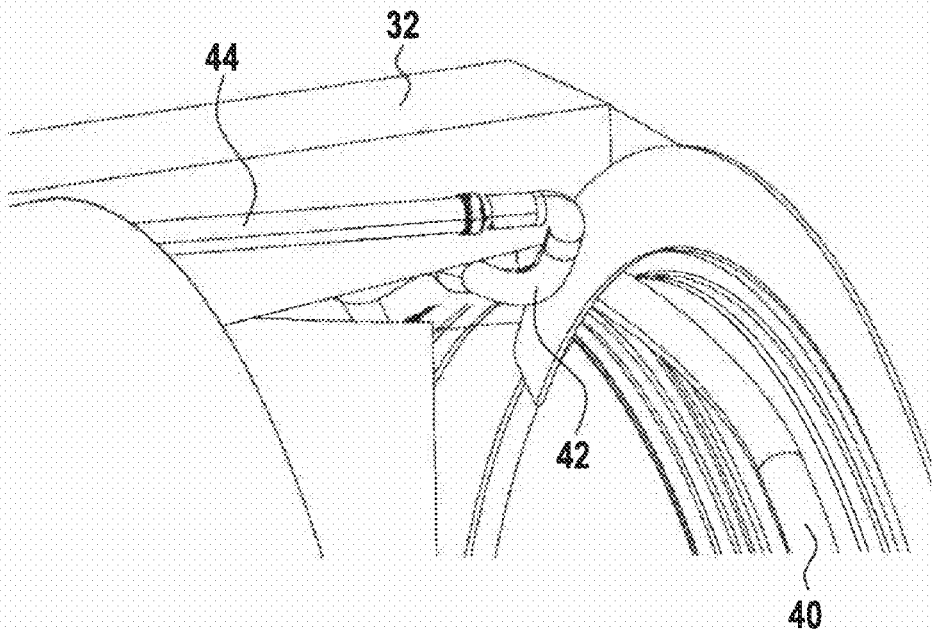

Thus, in the position of FIG. 3, the maintenance covers (not shown for reasons of clarity) are in the closed position, whereas in FIG. 4 they are in the open position (i.e. they have pivoted towards the pylon 32). In these figures, it can clearly be seen that the air diffusion pipes 42 have also pivoted in the direction indicated by arrow F3 (FIG. 3).

To enable such pivoting of the air diffusion pipes 42, they are advantageously made of a flexible material, such as a plastics material that might be covered with a mesh to reinforce its strength.

Furthermore, at its end remote from the air takeoff pipe, each air diffusion pipe 42 opens out into an air injection pipe 44 that is secured to the corresponding thrust reverser cover 30.

Figure 7:
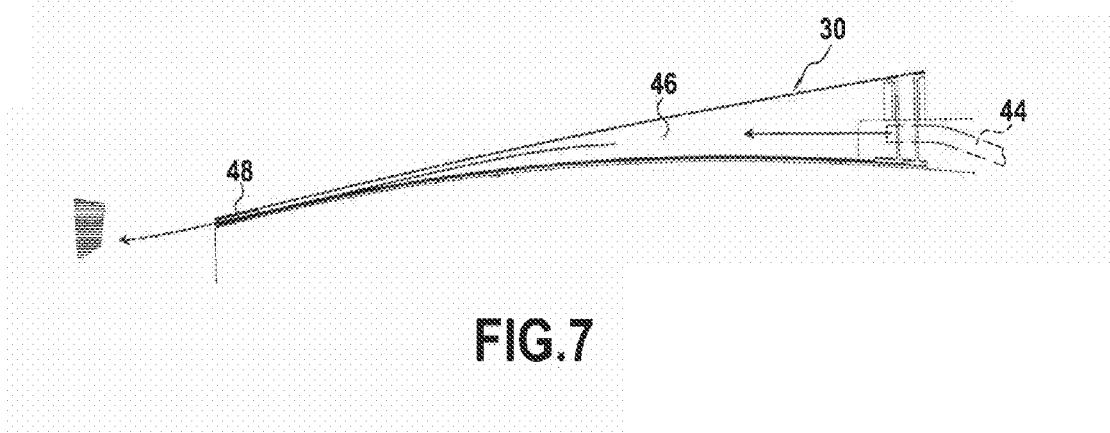
FIG. 7 is a section view on a radial plane showing a portion of the nacelle of the FIG. 1 turbomachine.

As shown in FIG. 7, which is a radial section of a thrust reverser cover 30, each air injection pipe 44 opens to the outside of the nacelle via its trailing edge.

More precisely, each air injection pipe 44 has its downstream end opening out into a cavity 46 formed inside the corresponding thrust reverser cover 30, this cavity being open at the trailing edge of the cover via one or more openings 48.

The air injection pipes 44 are firstly connected to an air diffusion pipe 42, and they are secondly fastened to a thrust reverser cover that is movable in longitudinal sliding.

In order to accommodate such sliding (whether upstream or downstream) of the thrust reverser covers, each air injection pipe 42 is suitable for uncoupling and coupling with the corresponding air diffusion pipe.

Figure 5:
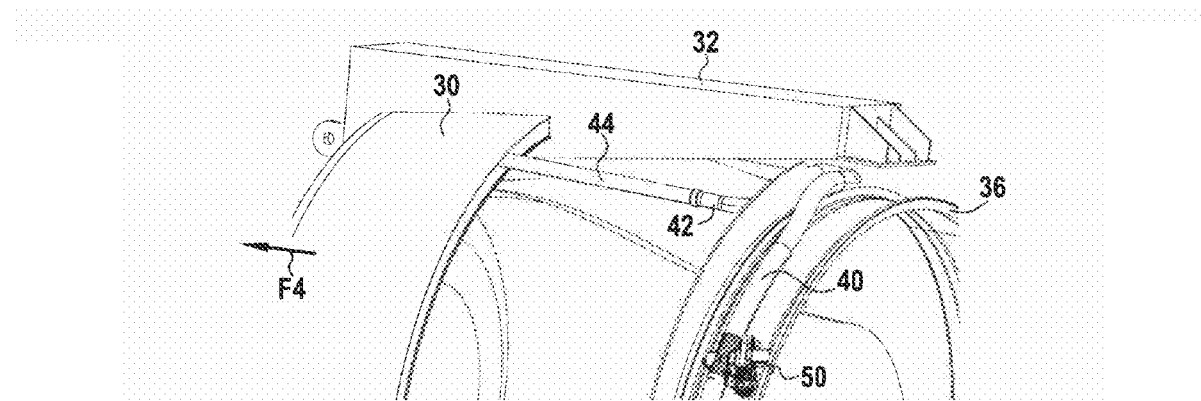

Thus, in the position of FIG. 5, which corresponds to the thrust reverser covers 30 being in a closed position, the air injection pipes 44 are coupled to the air diffusion pipes 42 such that the air taken from the primary channel is indeed injected through the trailing edge of the nacelle.

Figure 6:
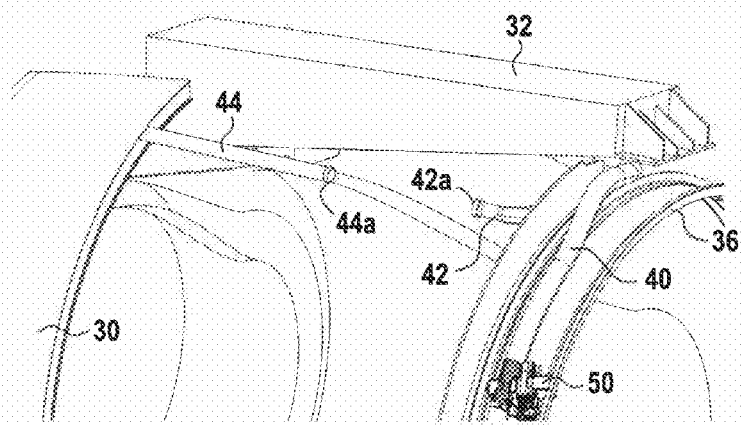

In contrast, in the position of FIG. 6, the thrust reverser covers have slid downstream relative to FIG. 5 (in the direction of arrow F4), such that the air injection pipes 44 that are secured to said covers have uncoupled from the air takeoff pipes. In this position that corresponds to thrust reversal, the air taken from the primary channel is therefore no longer conveyed to the trailing edge of the nacelle.

Once the thrust reversal stage has terminated, the thrust reverser covers are closed and the air injection pipes 44 are again coupled to the air diffusion pipes 42.

As shown in FIG. 6, in order to facilitate coupling and uncoupling the air injection and diffusion pipes, each air injection pipe 44 has an endpiece 44a of substantially conical shape, with the endpiece 42a of each air diffusion pipe 42 being of complementary shape.

Naturally, other means for guiding the air injection pipes and thus facilitating coupling with the air diffusion pipes could equally well be used.

According to an advantageous characteristic of the invention, the turbomachine further includes a valve 50 that is mounted on the air takeoff pipe 40 and that serves to control the characteristics of the air taken off from the fan channel (on/off, takeoff flow rate, etc.).

It should be observed that for reasons of clarity in the drawings, the fastenings of the various pipes to the corresponding covers and members of the turbomachine are not shown in any of the figures. Nevertheless, these fastenings are in themselves well known to the person skilled in the art.

What is claimed is:

1. A bypass turbomachine having a fan driven by a gas generator, an annular fan channel defined externally by a nacelle, and a primary annular channel for passing a flow of gas coming from the gas generator, the nacelle comprising from upstream to downstream:

a stationary air inlet sleeve;
two semi-cylindrical maintenance covers; and
two semi-cylindrical thrust reverser covers that are movable relative to said stationary air inlet sleeve by sliding in a direction parallel to the longitudinal axis of the turbomachine;
the turbomachine further comprising at least one air takeoff orifice in fluid communication with said annular fan channel, the orifice opening an air takeoff pipe housed inside said stationary air inlet sleeve of the nacelle, the air takeoff pipe opening out directly below a pylon fastening the nacelle under an airplane wing, into two air diffusion pipes, each of said two air diffusion pipes secured to one of each said two semi-cylindrical maintenance covers, each of said air diffusion pipes fluidly connected to an air injection pipe that is secured to one of said respective semi-cylindrical thrust reverser covers, said semi-cylindrical thrust reverser cover opening out towards the outside of the nacelle at the trailing edge thereof, each air injection pipe being capable of uncoupling from the corresponding air diffusion pipe on the corresponding semi-cylindrical thrust reverser cover sliding downstream.

2. A turbomachine according to claim 1, wherein the semi-cylindrical maintenance covers are movable relative to the stationary air inlet sleeve by pivoting about hinges parallel to the longitudinal axis of the turbomachine and abutting the pylon, each of said two air diffusion pipes being capable of deforming during pivoting of the corresponding semi-cylindrical maintenance cover.

3. A turbomachine according to claim 2, wherein each of said two air diffusion pipes is made of a flexible material.

4. A turbomachine according to claim 1, wherein each of said two air injection pipes includes an endpiece at the upstream end of each air injection pipe that is conical.

5. A turbomachine according to claim 1, further including a control valve mounted on the air takeoff pipe.

* * * * *